United States Patent Office.

DUANE HULL, OF BROOKLYN, NEW YORK.

Letters Patent No. 110,042, dated December 13, 1870.

IMPROVEMENT IN REFINING AND DECOLORIZING SIRUPS AND OTHER LIQUIDS, AND IN MATERIAL FOR THE SAME.

The Schedule referred to in these Letters Patent and making part of the same.

*To all whom it may concern:*

Be it known that I, DUANE HULL, of Brooklyn, in the county of Kings and State of New York, have invented a new and useful Improvement in Refining and Decolorizing Sirups and other Liquids, and in Material for the same; and I hereby declare the following to be a full and exact description of the same.

This invention consists in the manufacture and use of a material somewhat resembling bone-black in its properties, but superior in many respects, and much cheaper in cost, for filtering, purifying, and decolorizing sirups, spirits, oils, vegetable extracts, water, and other liquids and solutions which are to be purified by filtration.

The material which I use in carrying out my invention, and which I denominate carbonized iron-ore, is made by treating iron-ore with coal-tar, rosin, pitch, oil, or other carbonaceous material. The following method will answer, but I do not limit myself to that, as other equivalent means may be used.

I take granulated or pulverized iron and mix about ten parts with one part of coal-tar, then place the mixture in a retort, such as used for the manufacture of coal gas or for distilling coal, or in a suitable kiln or furnace, and there keep it at a red heat till all volatile matters are driven off. The kiln used for burning and reburning bone-black will answer for the preparation of my compound. When the mass is sufficiently burned, it is placed in coolers, such as used for bone-black, or dropped into water so as to be cooled. This product is then granulated, sifted, and sorted in the manner well known to the manufacturers of bone-black, and is ready to be used in clarifying sirups, spirits, and other liquids, either by filtration or by mixing and agitating the material with the liquid.

I have given what I regard as the best proportion, but I do not limit myself to these proportions, for they may be varied without departing from the nature of my invention.

After the material has been exhausted by use, it may be renewed or revivified by mixing it with a small quantity of coal-tar and reburning, or by simple reburning.

By means of this compound, sirups may be refined, spirits rectified, and liquids decolorized, in a better and cheaper manner than heretofore.

Having thus described my invention,

What I claim, and desire to secure by Letters Patent of the United States, is—

1. The process herein described, for purifying sirups, spirits, oils, and other liquids, consisting in treating them with carbonized iron-ore prepared and used substantially as herein set forth.

2. The new composition herein described, called carbonized iron-ore, produced by treating iron-ore by means of any suitable carbonizing material, and then cooling, granulating, and preparing the same so as to be used for filtering and purifying sirups and other liquids, as set forth.

DUANE HULL.

Witnesses:
THOMAS C. CONNOLLY,
F. A. LONG.